United States Patent
Yarman et al.

(10) Patent No.: US 9,442,892 B2
(45) Date of Patent: Sep. 13, 2016

(54) REPRESENTING A FUNCTION BANDLIMITED WITHIN A POLYGONAL SPACE

(71) Applicant: WESTERNGECO L.L.C., Houston, TX (US)

(72) Inventors: Can Evren Yarman, Houston, TX (US); Ryan Dean Lewis, Boulder, CO (US); Lucas Monzon, Boulder, CO (US)

(73) Assignee: WESTERNGECO L.L.C., Houston, TX (US)

(*) Notice: Subject to any disclaimer, the term of this patent is extended or adjusted under 35 U.S.C. 154(b) by 264 days.

(21) Appl. No.: 13/966,070

(22) Filed: Aug. 13, 2013

(65) Prior Publication Data

US 2014/0052766 A1      Feb. 20, 2014

Related U.S. Application Data

(60) Provisional application No. 61/684,048, filed on Aug. 16, 2012.

(51) Int. Cl.
*G06F 17/14*      (2006.01)
*G01V 1/28*      (2006.01)

(52) U.S. Cl.
CPC ............ *G06F 17/14* (2013.01); *G06F 17/141* (2013.01); *G01V 1/28* (2013.01)

(58) Field of Classification Search
USPC .................................................. 708/400–403
See application file for complete search history.

(56) References Cited

U.S. PATENT DOCUMENTS

| 5,838,832 | A | * | 11/1998 | Barnsley | ............... | H04N 19/99 |
|---|---|---|---|---|---|---|
| | | | | | | 375/E7.204 |
| 7,774,142 | B2 | | 8/2010 | Amundsen et al. | | |
| 2007/0090839 | A1 | | 4/2007 | Vittorio | | |
| 2008/0033655 | A1 | | 2/2008 | Ozbek et al. | | |
| 2010/0198897 | A1 | | 8/2010 | Yarman | | |
| 2012/0201096 | A1 | | 8/2012 | Valero et al. | | |

FOREIGN PATENT DOCUMENTS

| GB | 2450122 A | 12/2008 |
|---|---|---|
| WO | 2011051782 A2 | 5/2011 |
| WO | 2012057779 | 5/2012 |

OTHER PUBLICATIONS

International Search Report and Written Opinion of PCT Application No. PCT/US2013/054817 dated Nov. 1, 2013: pp. 1-11.
Beylkin et al., "On Generalized Gaussian Quadratures for Exponentials and Their Applications," Applied and Computational Harmonic Analysis, 2002, vol. 12: pp. 332.373.
Beylkin et al., "Grids and transforms for band-limited functions in a disk," Inverse Problems, 2007, vol. 23: 2059-2088.
Biondi, "Chapter 2: Full Prestack Migration Using Kirchhoff's Methods, Constant-velocity migration Equation (2.1)," 3D Seismic Imaging Investigations in Geophysics No. 14, Society of Exploration Geophysicists: Tulsa, 2006: pp. 9-10.

(Continued)

*Primary Examiner* — Tan V. Mai
(74) *Attorney, Agent, or Firm* — Abimbola Bukoye (57) ABSTRACT

Based at least in part on one or more characteristics relating to a measurement system, a polygonal space in a Fourier domain is determined. A representation of a function that is bandlimited within the polygonal space is computed.

19 Claims, 4 Drawing Sheets

(56) References Cited

OTHER PUBLICATIONS

Landau et al., "Prolate Spheroidal Wave Functions, Fourier Analysis and Uncertainty—II," The Bell System Technical Journal, Jan. 1961, vol. 40: pp. 65-84.
Slepian et al., "Prolate Spheroidal Wave Functions, Fourier Analysis and Uncertainty—I," The Bell System Technical Journal, Jan. 1961, vol. 40: pp. 43-63.
Slepian, "Prolate Spheroidal Wave Functions, Fourier Analysis and Uncertainty—IV: Extensions to Many Dimensions; Generalized Prolate Spheroidal Functions," The Bell System Technical Journal, Nov. 1964, vol. 43: pp. 3009-3057.
Xiao et al., "Prolate spheroidal wavefunctions, quadrature and interpolation," Inverse Problems, 2001, vol. 17: pp. 805-838.
McInturff, et al., "The Fourier transform of linearly varying functions with polygonal support", IEEE Transactions on Antennas and Propagation, Sep. 1991, pp. 1441-1443.
European Supplementary Search Report issued in related EP application 13829652.0 on Nov. 12, 2015, 3 pages.
Office Action issued in related EP application 13829652.0 on Nov. 24, 2015, 6 pages.

* cited by examiner

REPRESENTING A FUNCTION BANDLIMITED WITHIN A POLYGONAL SPACE

CROSS-REFERENCE TO RELATED APPLICATION

This application claims the benefit of U.S. Provisional Patent Application Ser. No. 61/684,048 filed Aug. 16, 2012, which is incorporated herein by reference in its entirety.

BACKGROUND

Survey data can be collected and processed to produce a representation (e.g. image, model, etc.) of a subsurface structure. Survey data can be collected using seismic survey equipment, electromagnetic survey equipment, or other types of survey equipment.

The processing of collected survey data can involve relatively complex computations. In some cases, such complex computations can produce artifacts that may lead to inaccurate results.

SUMMARY

In general, according to some implementations, based at least in part on one or more characteristics relating to a measurement system, a polygonal space in a Fourier domain is determined. A representation of a function that is bandlimited within the polygonal space is computed.

Other or alternative features will become apparent from the following description, from the drawings, and from the claims.

BRIEF DESCRIPTION OF THE DRAWINGS

Some embodiments are described with respect to the following figures.

DETAILED DESCRIPTION

A physical measurement system can be constrained in space (or time) and frequency. Examples of physical measurement systems include survey equipments, such as those used for acquiring survey data of target structures. A survey equipment can include seismic survey equipment, electromagnetic survey equipment, acoustic survey equipment, optical survey equipment, and so forth, for acquiring survey data regarding a target structure, such as a subterranean structure or another type of target structure. Examples of other types of target structures include human tissue, a mechanical structure, plant tissue, animal tissue, a solid volume, a substantially solid volume, a liquid volume, a gas volume, a plasma volume, a volume of space near and/or outside the atmosphere of a planet, asteroid, comet, moon, or other body, and so forth. A survey equipment can include one or more survey sources that produce survey signals that are propagated or emitted into the target structure. In addition, the survey equipment includes survey receivers to measure signals reflected from or affected by the target structure.

In other examples, other types of physical measurement systems can be used for measuring data. A physical measurement system being constrained in space (or time) and frequency refers to the fact that measurement data collected by the physical system is collected in finite space (or time) and within a given frequency range or ranges. Although reference is made to a physical measurement system constrained in space (or time) and frequency, it is noted that more generally, a physical measurement system can be constrained in at least one dimension. Despite measurement data of a physical measurement system being constrained in at least one dimension, computations performed for analyzing the measurement data can employ functions that are not correspondingly constrained.

Measurement data can be subjected to transformation from an original domain in which the measurement data was acquired, such as a space (or time) and frequency domain, into a different domain, such as a Fourier domain, which is a frequency-wavenumber domain. Once transformed into the Fourier domain, functions applied on the measurement data may not be constrained in a manner that corresponds to the constraint of the original measurement data in space (or time) and frequency. For example, in the Fourier domain, measurement data may be represented as a Fourier series, which is not constrained in time. As a result, functions applied in the Fourier domain for producing a result based on analysis of the measurement data may introduce artifacts, which can include edge effects or other types of effects. The presence of artifacts reduces accuracy of a result of the analysis. Examples of analyses that can be performed include any one or more of the following: an imaging process to produce an image of a target structure, a modeling process to produce a model of the target structure, a transformation process to transform data (such as a Tau-p (time-slowness) transform and its inverse, a Radon transform, a parabolic Radon transform, etc.), a migration process for migrating data, differentiation, definite integration, beam decomposition, and so forth.

Figure 1:
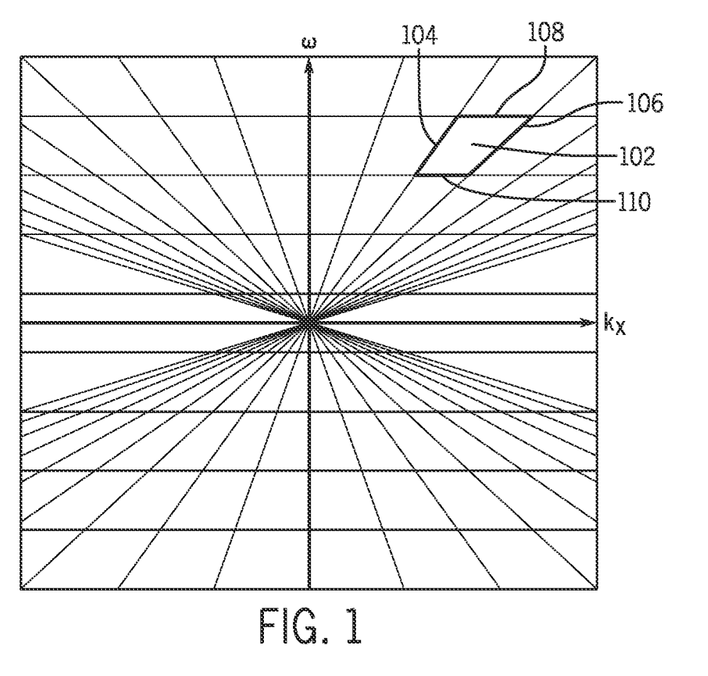
FIG. 1 is a graph showing regions in a frequency-wavenumber domain, where a function can be bandlimited in at least one of the regions according to some implementations.

In accordance with some implementations, a function that is used for processing measurement data constrained in space (or time) and frequency can be derived, where the function is constrained in a manner that corresponds to the constraint of the measurement data. FIG. 1 is a graph that plots regions in a frequency-wavenumber ($\omega$-$k_x$) space, which is also referred to as the Fourier space. The regions depicted in FIG. 1 have trapezoidal shapes. One of the trapezoidal regions is identified as 102 in FIG. 1. The trapezoidal region 102 can also be referred to as a "wedge."

The trapezoidal region 102 can be defined by two frequency points along the $\omega$ axis, and by two slopes extending from the origin at the intersection of the $\omega$ and $k_x$ axes. The two frequency points along the $\omega$ axis define the upper boundary 108 and lower boundary 110 of the trapezoidal region 102. The two slopes extending from the origin at the intersection of the $\omega$ and $k_x$ axes define the left boundary 104 and the right boundary 106 of the trapezoidal region 102.

In accordance with some implementations, a function that is used for performing analysis of measurement data that is constrained in at least one dimension, can be bandlimited in the trapezoidal region 102 (or a group of the trapezoidal regions).

A trapezoidal region is an example of a space in which a function according to some implementations can be bandlimited. In other implementations, a space in which a function can be bandlimited can include a polygonal space. In two dimensions, a polygonal space is a region shaped as a polygon. In three dimensions, a polygonal space includes a cross section that is shaped as a polygon. As an example, in three dimensions, a polygonal space can include a polyhedron.

A function being bandlimited to a polygonal space refers to the function producing a valid output in a frequency range and a wavenumber range of the polygonal space, and producing a null or zero output outside the frequency range and wavenumber range of the polygonal space. By using a function bandlimited to a polygonal space (in the frequency-wavenumber domain, which is also referred to as the Fourier domain) to perform computations with respect to measurement data that is constrained in at least one dimension, such as space (or time) and frequency, artifacts due to the computations by the function can be reduced to produce more accurate results of the computations.

Figure 2:
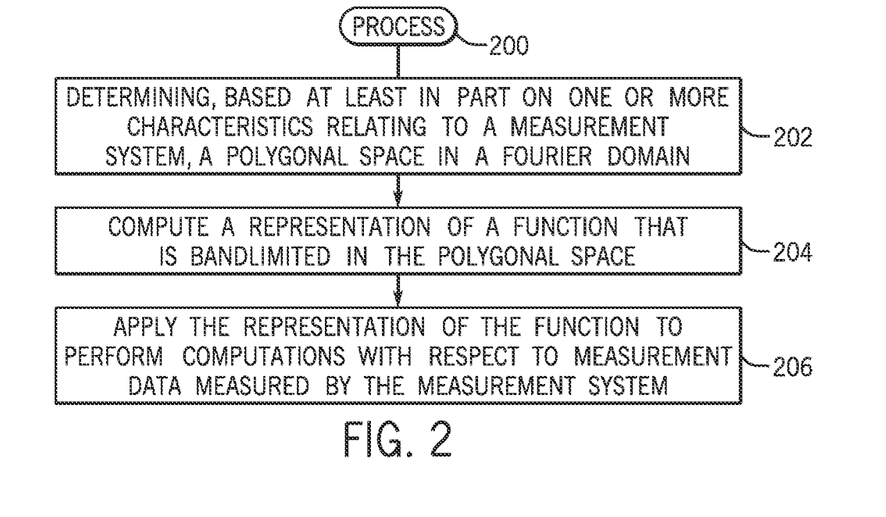
FIG. 2 is a flow diagram of a process according to some implementations.

FIG. 2 is a flow diagram of a process 200 according to some implementations. The process includes determining (at 202), based at least in part on one or more characteristics relating to a measurement system, a polygonal space in a Fourier domain. In some examples, the characteristics that define the polygonal space include the minimum and maximum frequencies of signals produced and/or received by the measurement system. The characteristics can also include the minimum and maximum velocities of signals (produced by and/or received by the measurement system) propagating through a medium. As a specific example, the left and right boundaries 104 and 106 of the trapezoidal region 102 in FIG. 1 depend upon the minimum speed and maximum velocities, respectively, of signals propagating through a medium. The velocities define the slopes represented by the left and right boundaries 104 and 106. The top and bottom boundaries 108 and 110 of the trapezoidal region 102 depend upon the minimum frequency and maximum frequency of signals, where the minimum and maximum frequencies define two points along the ω axis in FIG. 1.

The process 200 then computes (at 204) a representation of a function that is bandlimited in the polygonal space. The representation of the function can be applied (at 206) to perform computations with respect to measurement data measured by the measurement system.

The following provides further details regarding a function that is bandlimited within a polygonal space.

A function $f(t, x_1, \ldots, x_n)$, where $n > 1$, t represents time, $x_1, \ldots, x_n$ represent different offsets between a source and receiver, is bandlimited within a wedge W (e.g. trapezoidal region 102 in FIG. 1) if its Fourier transform $F(\omega, p_1, \ldots, p_n)$, where ω represents frequency and $p_1, \ldots, p_n$ represent slopes, is supported within the wedge, $$W = \left\{ \begin{array}{l} (\omega, p = (p_1, \ldots, p_n)): 0 \leq \omega_0 - \Delta\omega \leq \omega \leq \omega_0 + \Delta\omega, \\ p_{0k} - \Delta p_k \leq p_k \leq p_{0k} + \Delta p_k, k = 0, \ldots, n \end{array} \right\},$$

where p represents slope, such as the slopes represented by the left and right boundaries 104 and 106 of FIG. 1.

For the sake of discussion, the following considers a two-dimensional (2D) case. An extension to more dimensions is relatively straightforward. For the 2D case, a function $f$ bandlimited within a wedge can be expressed by $$f(t, x) = \int_W F(\omega, \omega p) \exp(i\omega(t - px)) \omega \, d\omega \, dp, \quad \text{(Eq. 1)}$$

$$W = \left\{ (\omega, p): \begin{array}{l} 0 \leq \omega_0 - \Delta\omega \leq \omega \leq \omega_0 + \Delta\omega \\ p_{0k} - \Delta p \leq p \leq p_0 + \Delta p \end{array} \right\}.$$

For the sake of simplicity, it can be assumed that the function $f$ is concentrated on $(t,x) \in [0,1] \times [-1,1]$, where t represents time and x represents a distance, such as an offset between a survey source and a survey receiver. More generally, $f$ can be concentrated in a different time range and distance range.

In the ensuing discussion, a function $f$ whose Fourier transform is bandlimited in a wedge is referred to as a wedge-bandlimited function.

A convolution kernel k is defined by setting its Fourier transform equal to 1 within the wedge and 0 elsewhere:

$$k(t,x) = \int_W \exp(i\omega(t-px)) \omega \, d\omega \, dp. \quad \text{(Eq. 2)}$$

Figure 3:
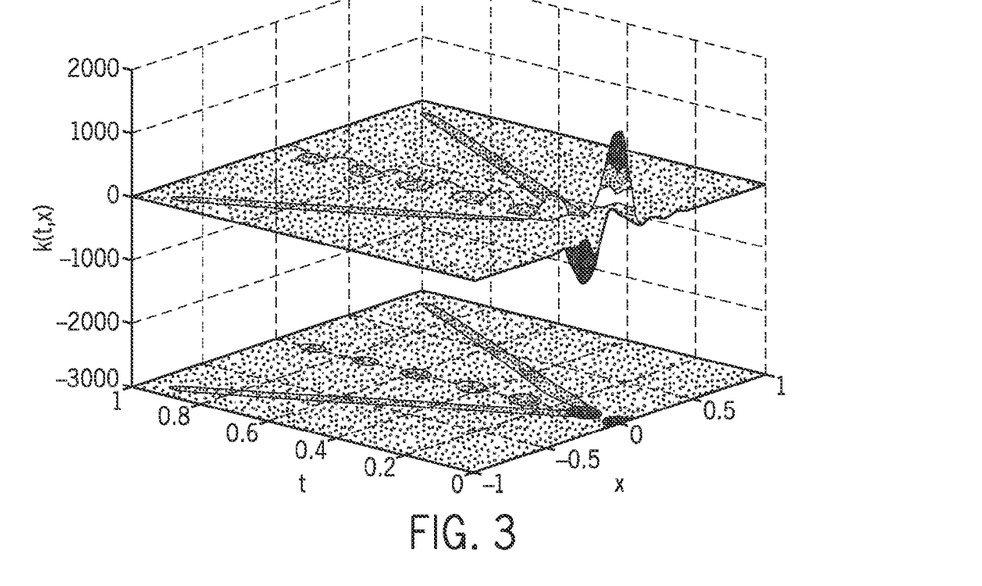
FIG. 3 is a graph showing a convolution kernel according to some implementations.

Eq. 2 expresses the time domain representation of the convolution kernel k. The kernel k represents the inverse Fourier transform of the characteristic function on the wedge, where the characteristic function equals to 1 within the wedge and 0 outside the wedge. A plot of an example kernel k is depicted in FIG. 3, which shows a plot of the real part of the kernel k (as expressed by Eq. 2) for an example wedge, $W = \{(\omega, p): 0 \leq \omega \leq 1, -1 \leq p \leq 1\}$. In FIG. 3, the vertical axis represents values of the kernel $k(t,x)$ expressed by Eq. 2, which is a function of time (t) and distance (x), represented as two orthogonal horizontal axes in FIG. 3.

Eq. 3 below defines a representation $f_W$, which is the convolution of the function $f$ with the convolution kernel k, restricted to $(t,x) \in [0,1] \times [-1,1]$:

$$f_W(t,x) = \int k(t-\tau, x-y) f(\tau, y) d\tau dy = f(t,x), \quad (t,x) \in [0,1] \times [-1, 1]. \quad \text{(Eq. 3)}$$

Figure 4:
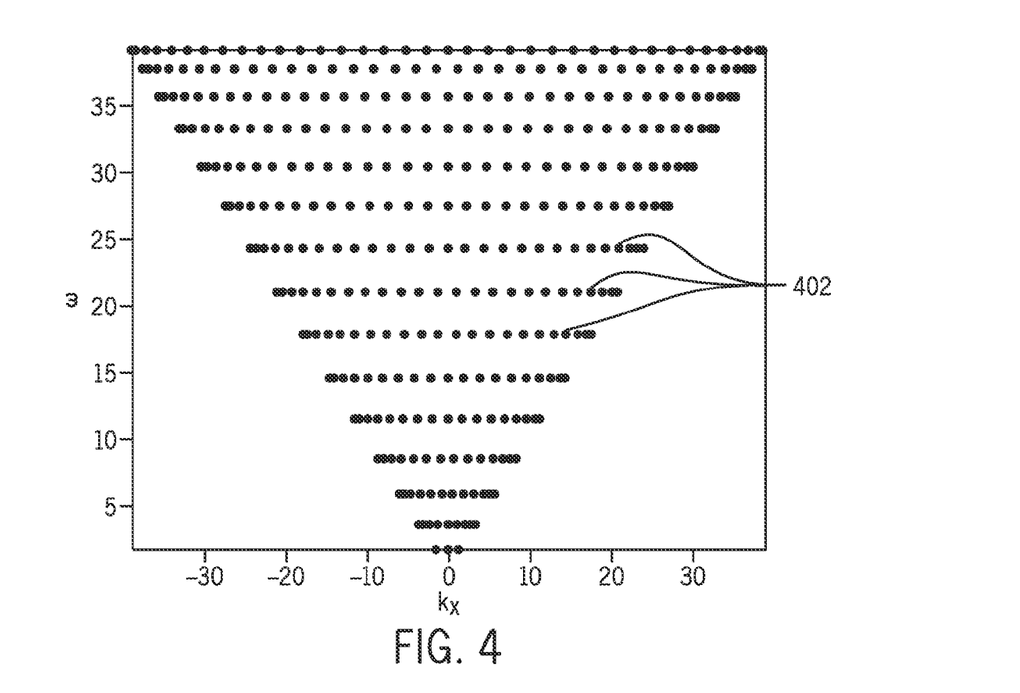
FIG. 4 is a graph showing nodes in a wedge defined in a frequency-wavenumber space, according to some implementations.

If the kernel k has an exponential sum representation:

$$k(t,x) = \Sigma_m w_m \exp(i(\alpha_m t + \beta_m x)), \quad \text{(Eq. 4)}$$

then any $f_W$, and any function that is bandlimited in the wedge W and concentrated in $(t,x) \in [0,] \times [-1,1]$, can be written using the same exponentials $(\alpha_m, \beta_m) \in R^2$, where $R^2$ is the domain represented in FIG. 4.

FIG. 4 is a plot of nodes (points) 402 in a frequency-wavenumber (ω-$k_x$) domain. The nodes 402 are provided in a wedge (corresponding to the wedge W discussed above). Each node 402 is represented by $(\alpha_m, \beta_m)$ in Eq. 4, where $(w_m, \alpha_m, \beta_m)$ represents a Gaussian quadrature. The parameter $w_m$ represents a weight used in the computation of the kernel k of Eq. 4. A Gaussian quadrature represents a way of discretizing integrals. In this disclosure, the representation of a wedge-bandlimited function is discretized (according to the Gaussian quadrature) by discretizing the frequency-wave number representation of the function (in other words, discretizing the Fourier integral in the frequency-wavenumber domain).

An exponential representation of the kernel k is determined by first performing the ω then p integration, as provided in Eq. 5 below:

$$k(t,x) = \int_{p_0-\Delta p}^{p_0+\Delta p} [\int_{\omega_0-\Delta\omega}^{\omega_0+\Delta\omega} \exp(i\omega(t-px)) \omega d\omega] dp, \quad \text{(Eq. 5)}$$

A parameter $k_1$ is defined by $$k_1(\tau) = \left[\int_{\omega_0-\Delta\omega}^{\omega_0+\Delta\omega} \exp(i\omega\tau)\omega d\omega\right] \quad \text{(Eq. 6)}$$

$$= \frac{\exp(i\omega\tau)}{i\tau}\omega\bigg|_{\omega_0-\Delta\omega}^{\omega_0+\Delta\omega} - \int_{\omega_0-\Delta\omega}^{\omega_0+\Delta\omega}\exp(i\omega\tau)d\omega$$

$$= \frac{\exp\left[i\binom{\omega_0+}{\Delta\omega}\tau\right]\binom{\omega_0+}{\Delta\omega} - \exp[i(\omega_0-\Delta\omega)\tau](\omega_0-\Delta\omega)}{i\tau} - $$

$$\frac{\exp[i(\omega_0+\Delta\omega)\tau] - \exp[i(\omega_0-\Delta\omega)\tau]}{(i\tau)^2}$$

$$= \frac{\omega_0\left[\begin{array}{c}\exp[i(\omega_0+\Delta\omega)\tau] - \\ \exp[i(\omega_0-\Delta\omega)\tau]\end{array}\right] + \Delta\omega\left[\begin{array}{c}\exp[i(\omega_0+\Delta\omega)\tau] - \\ \exp[i(\omega_0-\Delta\omega)\tau]\end{array}\right]}{i\tau} - $$

$$\frac{2i\sin(\Delta\omega_0\tau)\exp(i\omega_0\tau)}{(i\tau)^2}$$

$$= \frac{\omega_0\exp(i\omega_0\tau)2i\sin(\Delta\omega\tau) + \Delta\omega\exp(i\omega_0\tau)2\cos(\Delta\omega\tau)}{i\tau} - $$

$$\frac{2i\sin(\Delta\omega_0\tau)\exp(i\omega_0\tau)}{(i\tau)^2}.$$

Then, an exponential representation for $k_1$ is expressed as:

$$k_1(\tau) = \frac{\omega_0\exp(i\omega_0\tau)2i\sin(\Delta\omega\tau) + \Delta\omega\exp(i\omega_0\tau)2\cos(\Delta\omega\tau)}{i\tau} - \quad \text{(Eq. 7)}$$

$$\frac{2i\sin(\Delta\omega_0\tau)\exp(i\omega_0\tau)}{(i\tau)^2} = \sum_{m_1} w_{1,m_1}\exp(i\alpha_{m_1}\tau) + \varepsilon_1(\tau),$$

where $\alpha_{m_1} \in [(\omega_0-\Delta\omega),(\omega_0+\Delta\omega)]$ and the error term $\varepsilon_1(\tau)$ is bounded with a desired accuracy $\delta_1$, i.e. $|\varepsilon_1(\tau)| \le \delta_1$.

Substituting Eq. 7 into Eq. 5, the following representation of the kernel k is derived:

$$k(t,x) = \int_{p_0-\Delta p}^{p_0+\Delta p} k_1(t-px)dp = \quad \text{(Eq. 8)}$$

$$\int_{p_0-\Delta p}^{p_0+\Delta p}\sum_{m_1} w_{1,m_1}\exp(i\alpha_{m_1}(t-px))dp + $$

$$\int_{p_0-\Delta p}^{p_0+\Delta p}\varepsilon_1(t-px)dp = $$

$$\sum_{m_1} w_{1,m_1}\exp(i\alpha_{m_1}t)\left[\int_{p_0-\Delta p}^{p_0+\Delta p}\exp(-i\alpha_{m_1}px)dp\right] + $$

$$\varepsilon_{2,1}(t,x),$$

where $$\varepsilon_{2,1}(t,x) = \int_{p_0-\Delta p}^{p_0+\Delta p}\varepsilon_1(t-px)dp, \quad \text{(Eq. 9)}$$

with $|\varepsilon_2(t,x)| \le \delta_1 2\Delta p$. The parameter $k_2$ is defined by $$k_2(x,\omega) = \int_{p_0-\Delta p}^{p_0+\Delta p}\exp(-i\omega px)dp = \quad \text{(Eq. 10)}$$

$$\int_{-(p_0+\Delta p)}^{-(p_0-\Delta p)}\exp(i\omega px)dp = \int_{-\omega(p_0+\Delta p)}^{-\omega(p_0-\Delta p)}\exp(ikx)\omega^{-1}dk = $$

$$\frac{\exp(-i\omega(p_0+\Delta p)x) - \exp(-i\omega(p_0-\Delta p)x)}{-i\omega x} = $$

$$\frac{-2i\exp(-i\omega p_0 x)\sin(\Delta p\omega x)}{-i\omega x} = $$

$$2\Delta p\exp(-i\omega p_0 x)\text{sinc}(\Delta p\omega x),$$

where $\sin c(x) = \sin(x)/x$. An exponential representation for sin c and hence for $k_2$ can be provided as:

$$k_2(x,\omega) = \sum_{m_2}w_{2,m_2}(\omega)\exp(i\beta_{m_2}(\omega)x) + \varepsilon_{2,2}(x,\omega), \quad \text{(Eq. 11)}$$

where $\beta_{m_2}(\omega) \in [-\omega(p_0+\Delta p), -\omega(p_0-\Delta p)]$.

Substituting Eq. 11 into Eq. 8 provides:

$$k(t,x) = \sum_{m_1} w_{1,m_1}\exp(i\alpha_{m_1}t)k_2(x,\alpha_{m_1}) + \varepsilon_{2,1}(t,x) = \quad \text{(Eq. 12)}$$

$$\sum_{m_1} w_{1,m_1}\exp(i\alpha_{m_1}t)\left[\sum_{m_2}w_{2,m_2}(\alpha_{m_1})\exp(i\beta_{m,2}(\alpha_{m_1})x) + \right.$$

$$\left.\varepsilon_{2,2}(x,\alpha_{m_1})\right] + \varepsilon_{2,1}(t,x) = $$

$$\sum_{m_1}\sum_{m_2} w_{1,m_1}w_{2,m_2}(\alpha_{m_1})\exp(i(\alpha_{m_1}t + \beta_{m,2}(\alpha_{m_1})x)) + $$

$$\varepsilon_2(t,x)$$

where $$\varepsilon_2(t,x) = \sum_{m_1}w_{1,m_1}\exp(i\alpha_{m_1}t)\varepsilon_{2,2}(x,\alpha_{m_1}) + \varepsilon_{2,1}(t,x), \quad \text{(Eq. 13)}$$

with $|\varepsilon_2(t,x)| \le \max_{m_1}\{\varepsilon_{2,2}(x,\alpha_{m_1})\}|\Sigma_{m_1}w_{1,m_1}| + \delta_1 2\Delta p = \delta_2$.

Thus, by Eq. 12, for a given target accuracy, an approximate kernel k in terms of an exponential sum representation as in Eq. 4 is given by $$k(t,x) \approx \sum_{m_1}\sum_{m_2}w_{(m_1,m_2)}\exp(i(\alpha_{m_1}t + \beta_{m_1,m_2}x)), \quad \text{(Eq. 14)}$$

where $$w_{(m_1,m_2)} = w_{1,m_1}w_{2,m_2}(\alpha_{m_1})$$

$$\beta_{m_1,m_2} = \beta_{m,2}(\alpha_{m_1}). \quad \text{(Eq. 15)}$$

Once $\alpha_{m_1}$ and $\beta_{m,2}(\alpha_{m_1})$ are obtained, the weights $w_{(m_1,m_2)}$ can be computed by solving the Vandermonde system in Eq. 14.

Then, according to Eqs. 3 and 14, a wedge-bandlimited function concentrated within a region of interest (bandlimited in the wedge W) is approximated by $$f_W(t,x) \approx \sum_{m_1}\sum_{m_2}f_{(m_1,m_2)}\exp(i(\alpha_{m_1}t + \beta_{m_1,m_2}x)), (t,x) \in [0,1] \times [-1,1], \quad \text{(Eq. 16)}$$

where $$f_{(m_1,m_2)} = w_{(m_1,m_2)}\int\exp(-i(\alpha_{m_1}\tau + \beta_{m_1,m_2}y))f(\tau,y)d\tau dy, (\tau,y) \in [0,1] \times [-1,1]. \quad \text{(Eq. 17)}$$

Similar to Eq. 14, Eq. 16 defines a Vandermonde system. In Eq. 16, the value of $f_W(t,x)$ is based on the measurement data, and the values of $\alpha_{m_1}$ and $\beta_{m_1,m_2}$ are derived according to Eqs. 14 and 15. Thus, $f_{(m_1,m_2)}$ be solved for using Eq. 16.

Thus given the sample points $f_W(t_i,x_j) = f(t_i,x_j)$, $(t_i,x_j) \in [0,1] \times [-1,1]$, Eq. 16 can be solved for $f_{(m_1,m_2)}$. Due to the inherit structure of the Vandermonde system, fast algorithms for computation of $w_{(m_1,m_2)}$ and $f_{(m_1,m_2)}$ may be developed.

Any operation on $f_W$ can be equivalently performed on the kernel $\exp(i(\alpha_{m_1}t + \beta_{m_1,m_2}x))$, $(t,x) \in [0,1] \times [-1,1]$, such as an operation of an imaging process to produce an image of a target structure, an operation of a modeling process to produce a model of the target structure, a transformation process to transform data (such as a Tau-p transform and its inverse, a Radon transform, a parabolic Radon transform, etc.), a migration process for migrating data, differentiation, definite integration, beam decomposition, and so forth. The function $f$ can be considered to be decomposed into $f_{(m_1,m_2)}$. Thus, $f_{(m_1,m_2)}$ can be used as the function to be computed in various operations, such as those listed above.

The foregoing describes derivations for the 2D case. To extend to additional dimensions, $k_1$ becomes:

$$k_1(\tau) = \Sigma_{\omega_0 - \Delta\omega}^{\omega_0 + \Delta\omega} \exp(i\omega\tau)\omega^n d\omega.$$

A representation of the kernel k in the form of Eq. 7 with different weights and nodes $(w_{1,m_1}, \alpha_{m_1})$ can be obtained. Then $$k(t,x) = \prod_k \left( \int_{p_{0k}-\Delta p_k}^{p_{0k}+\Delta p_k} k_1(t-px) dp \right) = \quad \text{(Eq. 8)}$$

$$\prod_k \left( \int_{p_{0k}-\Delta p_k}^{p_{0k}+\Delta p_k} \sum_{m_1} w_{1,m_1} \exp(i\alpha_{m_1}(t-px)) dp + \int_{p_{0k}-\Delta p_k}^{p_{0k}+\Delta p_k} \varepsilon_1(t-px) dp \right), =$$

$$\sum_{m_1} w_{1,m_1} \exp(i\alpha_{m_1} t) \prod_k \left( \int_{p_{0k}-\Delta p_k}^{p_{0k}+\Delta p_k} \exp(-i\alpha_{m_1} px) dp \right) +$$

$$\varepsilon_{2,1}(t,x),$$

where each term of the product is in the form of $k_2$ and can be represented as in Eq. 11, leading to a representation of the form of Eq. 4.

Figure 5:
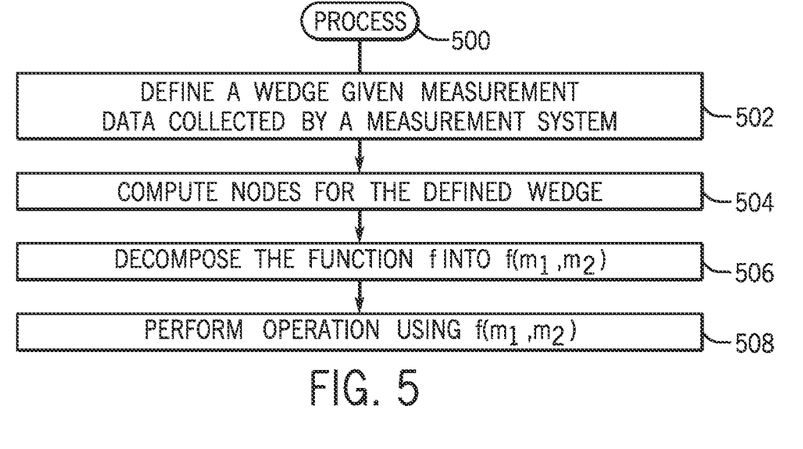
FIG. 5 is a flow diagram of a process according to further implementations

FIG. 5 is a flow diagram of a process 500 according to some implementations. The process 500 defines (at 502) a wedge (or other polygonal space) given measurement data collected by a measurement system. As noted above, the wedge depends upon characteristics related to the measurement system.

The process 500 computes (at 504) nodes for the defined wedge, such as nodes 402 depicted in FIG. 4. As noted above, the nodes 402 are represented by respective values for $(\alpha_m, \beta_m)$.

The process 500 then decomposes (at 506) the wedge-bandlimited function $f$ into a representation $f_{(m_1,m_2)}$, as expressed by Eq. 16 above. The representation $f_{(m_1,m_2)}$ can be computed based on values of $(\alpha_m, \beta_m)$, according to Eq. 16.

Once the representation, $f_{(m_1,m_2)}$, an operation can be performed (at 508) using $f_{(m_1,m_2)}$. The operation can include any of the following: an operation of a modeling process to produce a model of the target structure, a transformation process to transform data (such as a Tau-p transform and its inverse, a Radon transform, a parabolic Radon transform, etc.), a migration process for migrating data, differentiation, definite integration, beam decomposition, and so forth.

The following describes example operations that can be performed using the representation $f_{(m_1,m_2)}$. The first example operation is a Tau-p transform.

The Tau-p transform $T[f]$ of a function $f$ is defined by $$T[f](\tau,p) = \int f(\tau - xp, x) dx. \quad \text{(Eq. 18)}$$

Using the approximation of Eqs. 16 and 17, the Tau-p transform of the wedge-bandlimited function $f$ can be approximated by $$T[f_W](\tau,p) \approx \Sigma_{m_1} \Sigma_{m_2} T f_{(m_1,m_2)}(p) \exp(i\alpha_{m_1}\tau), \quad \text{(Eq. 19)}$$

where $$T f_{(m_1,m_2)}(p) = f_{(m_1,m_2)} \int_{-1}^{1} \exp(i(\beta_{m_1,m_2} - p\alpha_{m_1})x) dx = \quad \text{(Eq. 20)}$$

$$f_{(m_1,m_2)} 2 \operatorname{sinc}(\beta_{m_1,m_2} - p\alpha_{m_1}).$$

Thus, the computation of the Tau-p transform of $f$ becomes a computation of $f_{(m_1,m_2)}$ and evaluation of $$T[f_W](\tau,p) \approx \Sigma_{m_1} \Sigma_{m_2} f_{(m_1,m_2)} 2 \sin c(\beta_{m_1,m_2} - p\alpha_{m_1}) \exp(i\alpha_{m_1}\tau), \quad \text{(Eq. 21)}$$

which can be performed in a distributed manner by a parallel computer system in some examples.

The following describes an example inverse Tau-p transform of the function $f$. Using Eq. 21, two techniques of computing the inverse transform can be provided. First, given samples of the Tau-p transform, a least-squares problem can be solved.

$$T[f](\tau_k, p_k) \approx \Sigma_{m_1} \Sigma_{m_2} f_{(m_1,m_2)} 2 \sin c(\beta_{m_1,m_2} - p\alpha_{m_1}) \exp(i\alpha_{m_1}\tau), \quad \text{(Eq. 22)}$$

where k=1, 2, . . . , K are the samples. The representation $f_{(m_1,m_2)}$ is obtained, and the inversion process is complete.

In other implementations, Eq. 21 shows that the Tau-p transform is a sum of exponential functions that are bandlimited in the Tau-direction and the p-direction by the largest $\alpha_{m_1}$. Generalized prolate spheroidal wave functions for functions can be defined that are bandlimited to a square (or any convenient region that contains the square, such as a disk). Then the Tau-p samples are projected onto the space spanned by these generalized prolate spheroidal wave functions (either by solving a least squares system, approximating inner products, or using an interpolating basis, depending on the grid on which Tau-p samples are supplied). Once the projection is complete, the inverse Tau-p transform is obtained from the expansion coefficients and the inverse transforms of the basis functions.

The following describes an example migration operation. In its simplest form, the migration $M[f]$ of a function $f$ is provided by $$M[f](z) = \int w_M(x,z) f(t = \tau(x,z), x) dx, \quad \text{(Eq. 23)}$$

for functions $w_M(x,z)$ and $\tau(x,z)$, which are referred to as the migration weights and travel time functions, respectively. Then migration of the wedge-bandlimited function $f$ becomes $$M[f_W](z) \approx \Sigma_{m_1} \Sigma_{m_2} f_{(m_1,m_2)} \int w_M(x,z) \exp(i(\alpha_{m_1}\tau(x,z) + \beta_{m_1,m_2}x)) dx]. \quad \text{(Eq. 24)}$$

Thus, once $f$ is decomposed into $f_{(m_1,m_2)}$, computation of the migration operator for different migration weight and travel time functions can be performed independently of $f$, which allows the migration process to be executed in parallel on a parallel computer system in some examples.

Furthermore, Eq. 16 provides a plane wave representation with slowness $p_{m_1,m_2} = \beta_{m_1,m_2}/\alpha_{m_1}$. Thus, for each $p_{m_1,m_2}$, the travel time can be computed using ray tracing and localized along each ray as $$M[f_W](z) \approx \quad \text{(Eq. 25)}$$

$$\sum_{m_1} \sum_{m_2} f_{(m_1,m_2)} \left[ \int w_M(x,z) \exp(i(\alpha_{m_1}\tau(x_0,z,p_{m_1,m_2}) + $$

-continued $$(x-x_0)p_{m_1,m_2} + \beta_{m_1,m_2}x_0))dx] =$$

$$\sum_{m_1}\sum_{m_2} f_{(m_1,m_2)} \left[ \int w_M(x,z)\exp( \right.$$

$$\left. i(\alpha_{m_1}\tau(x_0,z,p_{m_1,m_2}) + \beta_{m_1,m_2}x))dx \right].$$

The term inside the square brackets may be regarded as a beam along the ray centered at $x_0$ with slowness vector $p_{m_1,m_2}$, frequency $\alpha_{m_1}$ and amplitude $f_{(m_1,m_2)}$. Based on the amplitude, Eq. 24 can be aggregated with fewer terms, which may be comparably faster to compute than Eq. 23.

Figure 6:
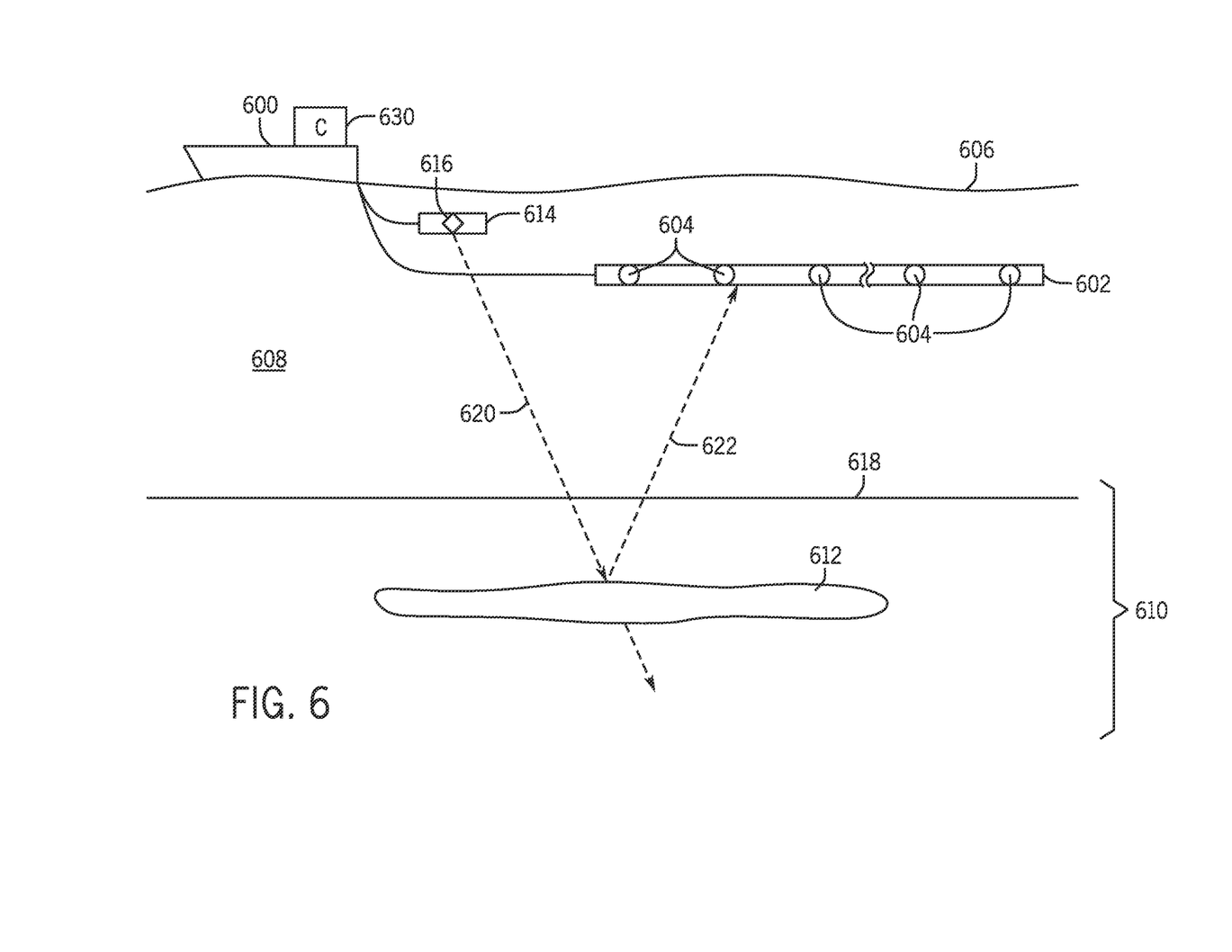
FIG. 6 is a block diagram of an example survey arrangement, according to some implementations.

FIG. 6 illustrates an example physical measurement system, which includes a marine survey arrangement. In other examples, other types of physical measurement systems are contemplated. The marine survey arrangement includes a marine vessel 600 for towing a streamer 602 (or other type of carrier) that includes seismic receivers 604. In addition, the marine vessel 600 (or a different marine vessel) can tow a seismic source assembly 614, which has at least one seismic source 616. Although just one streamer 602 and one seismic source assembly 614 are depicted in FIG. 6, it is noted that there can be more than one streamer and/or more than one seismic source assembly in other examples.

In other examples, instead of towing one or more streamers that carry survey receivers, a water bottom cable (deployed on the water bottom surface 618) can be used, where the water bottom cable carries survey receivers.

In examples according to FIG. 6, the marine vessel 600 tows the streamer 602 and seismic source assembly 614 through a body of water 608 above a water bottom surface 618 (e.g. seafloor). A subsurface structure 610 is located below the bottom surface 618, and the subsurface structure 610 includes at least one subsurface element 612 of interest. Examples of the subsurface element 612 can include a hydrocarbon-bearing reservoir, a freshwater aquifer, a gas injection zone, or other subsurface element of interest.

FIG. 6 further depicts an arrow 620 that represents a seismic wavefield generated by the seismic source 616 and traveling generally downwardly into the subsurface structure 610. A portion of the seismic wavefield 620 is reflected from the subsurface structure 610, and travels generally upwardly (as indicated by arrow 622) toward the streamer 602. The upgoing seismic wavefield (622) is detected by the seismic receivers 604 of the streamer 602.

FIG. 6 further depicts a control system 630 deployed at the marine vessel 600. The control system 630 can be used to control activation of the seismic source assembly 614. The control system 630 can also receive measurement data (containing measured survey data) collected by the seismic receivers 604. In some examples, the control system 630 is able to process the collected measurement data, such as to develop an image, a model, or other representation of the subsurface structure 610, using bandlimited functions as discussed above. In other examples, the collected measurement data from the seismic receivers 604 can be communicated to a remote system for further processing.

Figure 7:
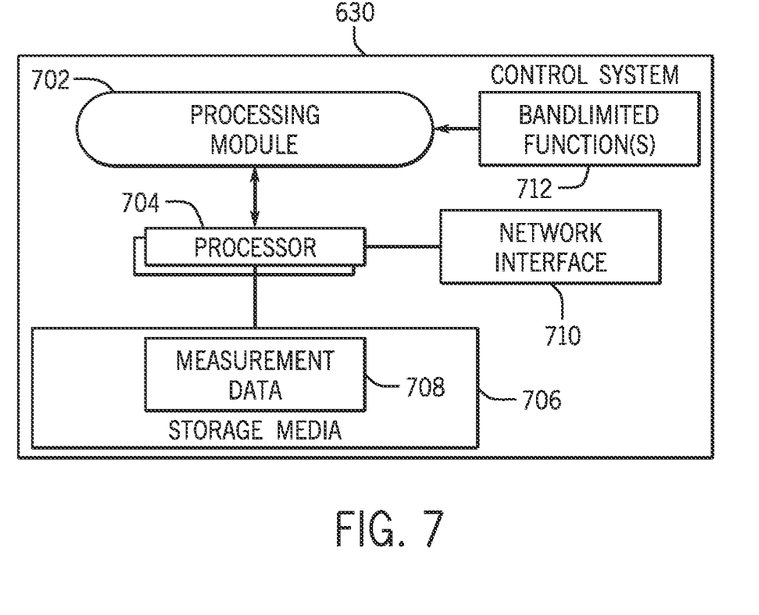
FIG. 7 is a block diagram of a control system according to some implementations.

FIG. 7 illustrates an example control system 630 according to some implementations. The control system 630 includes a processing module 702, which can be implemented as machine-readable instructions executable on one or multiple processors 704. The processing module 702 can apply one or more bandlimited functions 712 as discussed above. The control system 630 can be implemented with a computer system, or with a distributed arrangement of computer systems. A processor can include a microprocessor, microcontroller system, processor module or subsystem, programmable integrated circuit, programmable gate array, or another control or computing device.

The processor(s) 704 is (are) connected to a storage medium (or storage media) 706, which can store measurement data 708 collected by the survey receivers. The control system 630 also includes a network interface 710 to allow the control system 630 to communicate with another system, such as with the streamer 602 to collect the measurement data, or with another system that communicates the measurement data to the control system 630.

The storage medium or storage media 706 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or in other examples, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In general, according to some implementations, based at least in part on one or more characteristics relating to a measurement system, a polygonal space in a Fourier domain is determined. A representation of a function that is bandlimited within the polygonal space is computed.

In general, according to further or other implementations, parameters representing a Gaussian quadrature for the polygonal space are computed.

In general, according to further or other implementations, a subset of the parameters defines nodes within the polygonal space.

In general, according to further or other implementations, the representation is computed using the subset of parameters.

In general, according to further or other implementations, the polygonal space is a two-dimensional region shaped as a polygon.

In general, according to further or other implementations, the polygonal space is part of a three-dimensional polyhedron-shaped space, and the computed function is bandlimited within the three-dimensional polyhedron-shaped space.

In general, according to further or other implementations, a computation is performed on measurement data collected by the measurement system, the computation using the representation of the function.

In general, according to further or other implementations, the computation performed on the measurement data is constrained in at least one dimension.

In general, according to further or other implementations, the at least one dimension is selected from the group consisting of time, space, and frequency.

In general, according to further or other implementations, the polygonal space is defined by frequencies and by slopes extending from an intersection of a frequency axis and wavenumber axis in the Fourier domain.

In general, according to further or alternative implementations, a system includes at least one processor to: define a polygonal space in a frequency-wavenumber domain, the polygonal space based at least in part on one or more characteristics relating to a measurement system; and compute a representation of a function that is bandlimited within the polygonal space.

In general, according to further or other implementations, the one or more characteristics include at least one selected from the group consisting of: signal velocity and signal frequency.

In general, according to further or other implementations, the at least one processor is to further perform an operation on measurement data collected by the measurement system, the operation using the representation of the function.

In general, according to further or other implementations, the operation is at least one selected from the group consisting of: an operation of an imaging process to produce an image of a target structure, an operation of a modeling process to produce a model of the target structure, a transformation process to transform data, a migration process for migrating data, differentiation, integration, and beam decomposition.

In general, according to further or other implementations, the representation of the function is computed using parameters of a Gaussian quadrature.

In general, according to further or other implementations, the parameters of the Gaussian quadrature define nodes within the polygonal space.

In general, according to further or other implementations, the polygonal space is a polygon.

In general, according to further or other implementations, the polygonal space is a polyhedron.

In general, according to further or other implementations, an article comprises at least one machine-readable storage medium storing instructions that upon execution cause a system to determine, based at least in part on one or more characteristics relating to a measurement system, a polygonal space in a Fourier domain; compute, using parameters of a Gaussian quadrature, a representation of a function that is bandlimited within the polygonal space; receive measurement data from the measurement system, the measurement data constrained in at least one dimension; and use the representation of the function to perform an operation on the measurement data.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a computer system comprising:
   determining, based at least in part on one or more characteristics relating to a physical measurement system that acquires survey data regarding a target structure, a polygonal space in a Fourier domain;
   computing a representation of a function that is bandlimited within the polygonal space, the function producing a valid output in a frequency range and a wavenumber range of the polygonal space; and
   performing a computation on measurement data collected by the physical measurement system, the computation using the representation of the function.

2. The method of claim 1, further comprising:
   computing parameters representing a Gaussian quadrature for the polygonal space.

3. The method of claim 2, wherein a subset of the parameters define nodes within the polygonal space.

4. The method of claim 3, wherein computing the representation uses the subset of parameters.

5. The method of claim 1, wherein the polygonal space is a two-dimensional region shaped as a polygon.

6. A method of a computer system comprising:
   determining, based at least in part on one or more characteristics relating to a physical measurement system that acquires survey data regarding a target structure, a polygonal space in a Fourier domain, wherein the polygonal space is part of a three-dimensional polyhedron-shaped space, and wherein the computed function is bandlimited within the three-dimensional polyhedron-shaped space;
   computing a representation of a function that is bandlimited within the polygonal space; and
   performing a computation on measurement data collected by the physical measurement system, the computation using the representation of the function.

7. The method of claim 6, wherein the computation is at least one selected from the group consisting of a computation of an imaging process to produce an image of the target structure, and a computation of a modeling process to produce a model of the target structure.

8. The method of claim 1, wherein performing the computation on the measurement data comprises performing the computation on the measurement data that is constrained in at least one dimension.

9. The method of claim 8, wherein the at least one dimension is selected from the group consisting of time, space, and frequency.

10. The method of claim 1, wherein the polygonal space is defined by frequencies and by slopes extending from an intersection of a frequency axis and wavenumber axis in the Fourier domain.

11. The method of claim 1, wherein the computation is at least one selected from the group consisting of a computation of an imaging process to produce an image of the target structure, and a computation of a modeling process to produce a model of the target structure.

12. A system comprising:
   at least one processor to:
      define a polygonal space in a frequency-wavenumber domain, the polygonal space based at least in part on one or more characteristics relating to a measurement system;
      compute a representation of a function that is bandlimited within the polygonal space; and
      perform an operation on measurement data collected by the measurement system, the operation using the representation of the function, wherein the operation is at least one selected from the group consisting of an operation of an imaging process to produce an image of a target structure, and an operation of a modeling process to produce a model of the target structure.

13. The system of claim 12, wherein computing the representation of the function uses parameters of a Gaussian quadrature.

14. The system of claim 13, wherein the parameters of the Gaussian quadrature define nodes within the polygonal space.

15. The system of claim 12, wherein the polygonal space is a polygon.

16. The system of claim 12, wherein the polygonal space is a polyhedron.

17. The system of claim 12, wherein the one or more characteristics include at least one selected from the group consisting of signal frequency and signal velocity.

18. An article comprising at least one non-transitory machine-readable storage medium storing instructions that upon execution cause a system to:

determine, based at least in part on one or more characteristics relating to a physical measurement system, a polygonal space in a Fourier domain;

compute, using parameters of a Gaussian quadrature, a representation of a function that is bandlimited within the polygonal space;

receive measurement data from the physical measurement system that acquires survey data regarding a target structure, the measurement data constrained in at least one dimension; and use the representation of the function to perform an operation on the measurement data.

19. The article of claim 18, wherein the operation is at least one selected from the group consisting of an operation of an imaging process to produce an image of the target structure, and an operation of a modeling process to produce a model of the target structure.

* * * * *